United States Patent
Garcia (10) Patent No.: US 11,554,622 B2
(45) Date of Patent: Jan. 17, 2023

(54) BALL MOUNT WITH INDICATOR

(71) Applicant: U-Haul International, Inc., Phoenix, AZ (US)

(72) Inventor: Marco Garcia, Chandler, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 147 days.

(21) Appl. No.: 17/109,944

(22) Filed: Dec. 2, 2020

(65) Prior Publication Data

US 2021/0162823 A1 Jun. 3, 2021

Related U.S. Application Data

(60) Provisional application No. 62/942,825, filed on Dec. 3, 2019.

(51) Int. Cl.
*B60D 1/24* (2006.01)
*B60D 1/06* (2006.01)

(52) U.S. Cl.
CPC .............. *B60D 1/248* (2013.01); *B60D 1/06* (2013.01)

(58) Field of Classification Search
CPC .................................................. B60D 1/248
See application file for complete search history.

(56) References Cited

U.S. PATENT DOCUMENTS

| | | | | |
|---|---|---|---|---|
| 3,700,053 A | * | 10/1972 | Glissendorf | G01G 3/08 |
| | | | | 177/136 |
| 6,053,521 A | | 4/2000 | Schertler | |
| 6,142,500 A | | 11/2000 | Sargent | |
| 6,494,478 B1 | * | 12/2002 | MacKarvich | B60D 1/06 |
| | | | | 280/483 |
| 7,093,845 B1 | * | 8/2006 | Fast | B60D 1/50 |
| | | | | 280/511 |
| 9,643,462 B2 | * | 5/2017 | McAllister | B60D 1/248 |
| 2009/0107735 A1 | | 4/2009 | Cleary | |
| 2020/0384817 A1 | * | 12/2020 | Anderson | B60D 1/248 |

* cited by examiner

*Primary Examiner* — Kevin Hurley
(74) *Attorney, Agent, or Firm* — Richard E. Oney; Venjuris, P.C.

(57) ABSTRACT

A tow hitch assembly includes a draw bar and a hitch ball mount pivotally supported by the draw bar. A compression spring is disposed longitudinally between the draw bar and the hitch ball mount. The compression spring exerts a force that opposes a downward pivoting motion of the hitch ball mount when weight is placed on the hitch ball mount. The compression spring cooperates with an indicator configured to indicate to a user whether the weight placed on the hitch ball mount is within a predetermined weight range. The compression spring is removable and replaceable with a second compression spring that has a different spring constant. The second compression spring cooperates with the indicator to indicate to a user whether the weight placed on the hitch ball mount is within a second, different predetermined weight range.

14 Claims, 7 Drawing Sheets

BALL MOUNT WITH INDICATOR

RELATED APPLICATION

This application claims the benefit of U.S. Provisional Application No. 62/942,825, filed Dec. 3, 2019, entitled "Ball Mount with Indicator," which is incorporated herein in its entirety by this reference.

BACKGROUND

This invention relates generally to hitch assemblies for coupling a trailer to a towing vehicle. More specifically, the invention relates to a hitch assembly that indicates to a user whether a pre-determined trailer tongue weight has been met when a trailer is attached to a tow vehicle.

Automobiles, trucks and other vehicles are regularly equipped for towing trailers. In doing so, it is important for the user to determine that the weight of the trailer tongue on the hitch meets the desired level of such weight for the particular trailer being towed.

It is an object of the present invention to provide an apparatus that allows a user to easily determine that such desired trailer tongue weight has been met.

It is another object of the present invention to provide such an apparatus that is relatively easy to manufacture and to use.

It is still another object of the present invention to provide such an apparatus that can be readily modified by a user to work with trailers having different desired tongue weight ranges.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a tow hitch assembly that includes a draw bar configured to be mounted to a towing vehicle and a hitch ball mount that is pivotally supported by the draw bar and is configured to support a hitch ball. A compression spring is disposed generally longitudinally between the draw bar and the hitch ball mount. The compression spring has a spring constant and exerts a force that opposes a downward pivoting motion of the hitch ball mount when a weight is placed on the hitch ball mount. The compression spring cooperates with a weight indicator configured to indicate to a user whether the weight placed on the hitch ball mount is within a predetermined weight range. The compression spring is removable and replaceable with a second compression spring that has a different spring constant. The second compression spring cooperates with the weight indicator to indicate to a user whether the weight placed on the hitch ball mount is within a second, different predetermined weight range.

In some embodiments, the weight indicator includes a marking disposed on the hitch ball mount and the marking appears through a sight window hole disposed in the draw bar when the weight placed on the hitch ball mount is within a predetermined weight range.

In some embodiments of the invention, the draw bar includes a yoke configured to support a clevis pin generally disposed along a transverse axis and the hitch ball mount is rotationally coupled to the clevis pin. A forward portion of the compression spring can be disposed over a cylindrical protrusion extending rearward from the draw bar, and rearward portion of the compression spring can be disposed over a cylindrical protrusion forward extending from the hitch ball mount. A removable stop pin can be disposed laterally within the yoke rearward of the clevis pin so as to prevent the hitch ball mount from rotating upward to a position where the compression spring would be displaced from between the draw bar distal portion and the hitch ball mount.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DETAILED DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description, which follows is to be understood as a broad, teaching disclosure directed to persons of ordinary skill in the appropriate arts, and not as limiting upon the invention.

It will be appreciated that terms such as "forward," "rearward," "upper," "inner," "outer," "vertical," "horizontal," "bottom," "below," "top," "side," "inwardly," "outwardly," "downwardly" and "lower" and other positional descriptive terms used in this specification are used merely for ease of description and refer to the orientation of the referenced components as shown in the figures. It should be understood that any orientation of the components described herein is within the scope of the present invention.

FIGS. 1-6 illustrate one embodiment of a tow hitch assembly according to the present invention, generally designated as 10. The tow hitch assembly 10 includes a hitch ball assembly 12 pivotally supported by a draw bar 14 that has a proximal portion 16 and a distal portion 18. The hitch ball assembly 12 includes a hitch ball mount 28 that is generally L-shaped and has a generally vertical leg 30 and a generally horizontal leg 32. A hitch ball 34 with a threaded shank 36 is removably mounted to the hitch ball mount horizontal leg 32 with a hitch ball nut (not shown). Because the hitch ball 34 is removable, hitch balls of various sizes (e.g., 2", 2⅝" or another size) can be used. The draw bar proximal portion 16 is sized and shaped to closely fit within a receiver mounted to a vehicle (not shown). The draw bar 14 has side holes 19 for receiving a lateral hitch pin (not shown). When the draw bar proximal portion 16 is inserted into the receiver tube, it can be longitudinally positioned so that the draw bar side holes 19 align with corresponding side holes in the receiver tube. Once aligned, a hitch pin (not shown) can be inserted through the draw bar side holes 19 and the aligned receiver side holes (not shown) to prevent the draw bar 14 from moving longitudinally within the receiver tube. The hitch pin can be held in place by a hitch pin clip (not shown), as is known in the art, to prevent lateral forces from removing the hitch pin from the side holes 19.

Figure 1:
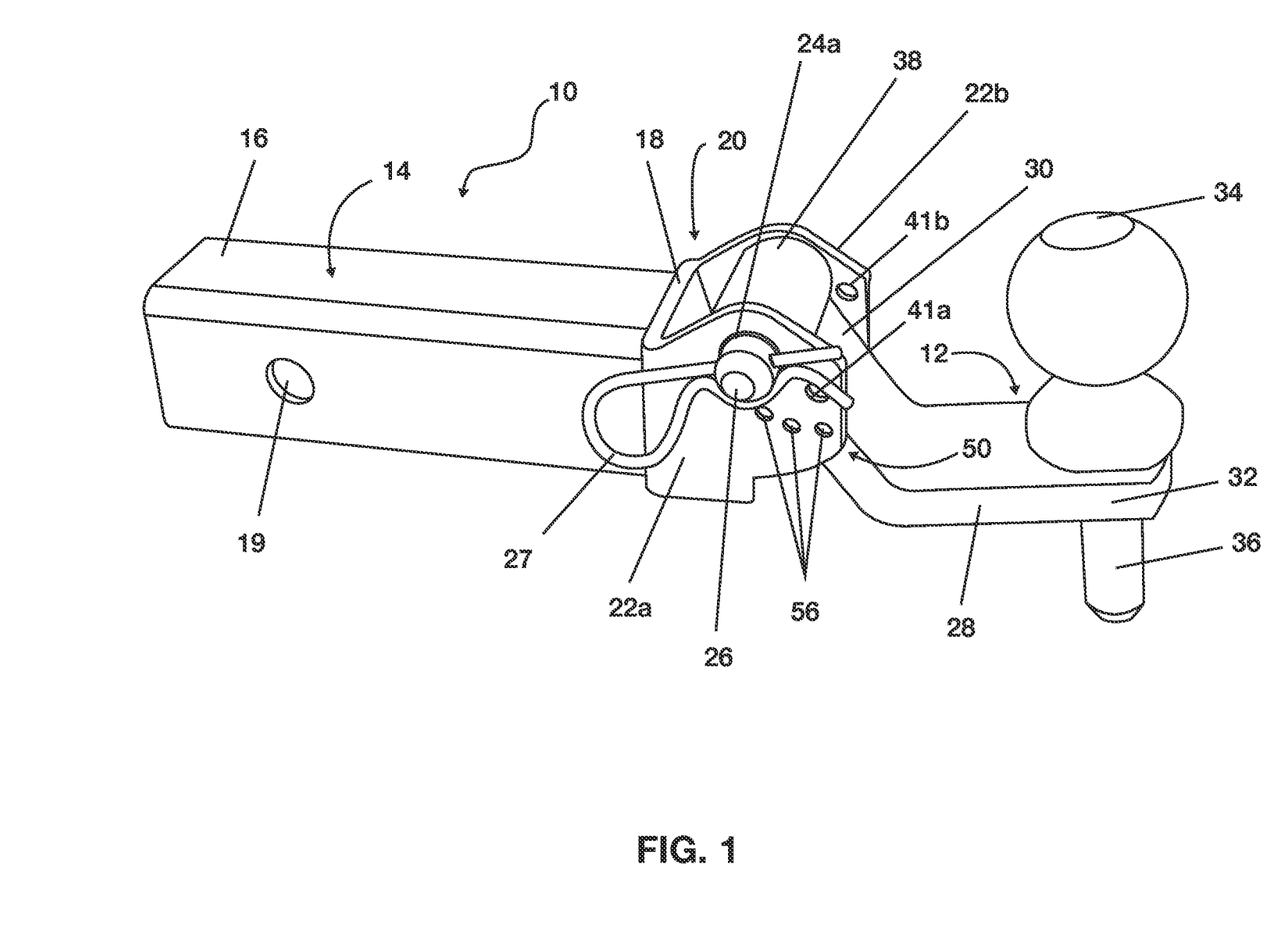
FIG. 1 is a perspective view of one embodiment of a tow hitch assembly according to the present invention.
Figure 2:
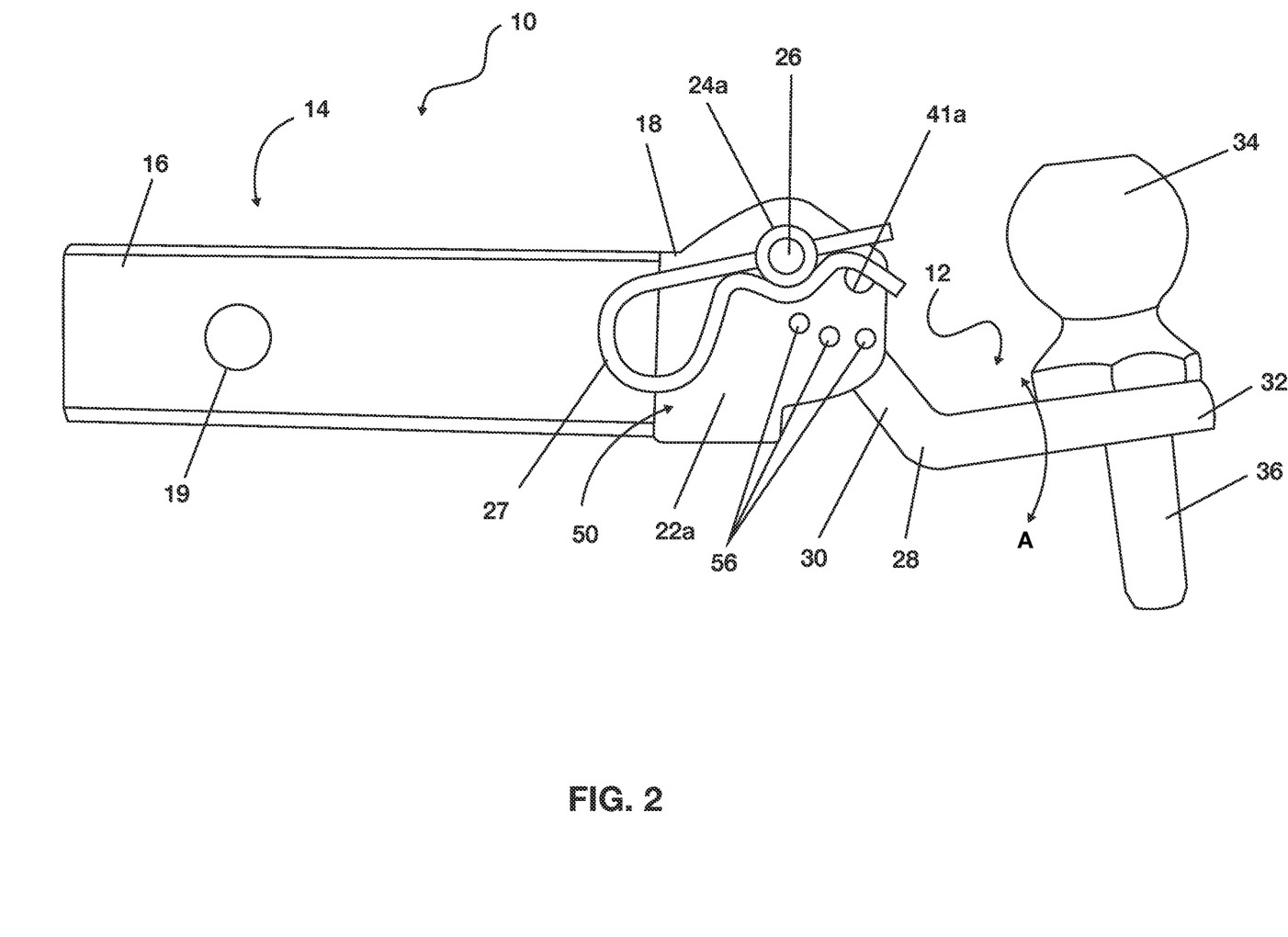
FIG. 2 is a side elevation view of the tow hitch assembly of FIG. 1 showing the assembly without any weight being loaded onto the hitch ball.
Figure 3:
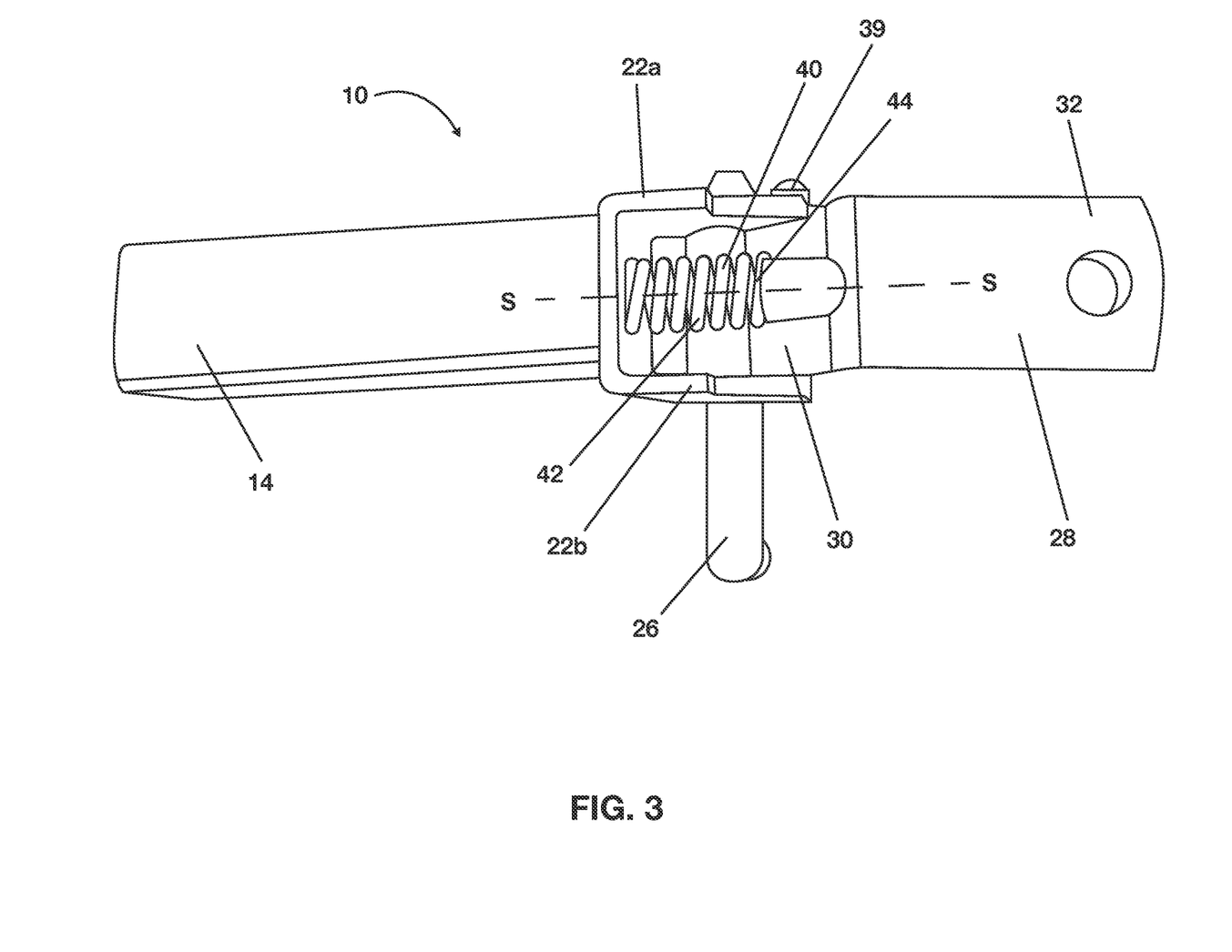
FIG. 3 is a bottom plan view of the tow hitch assembly of FIG. 1.
Figure 4:
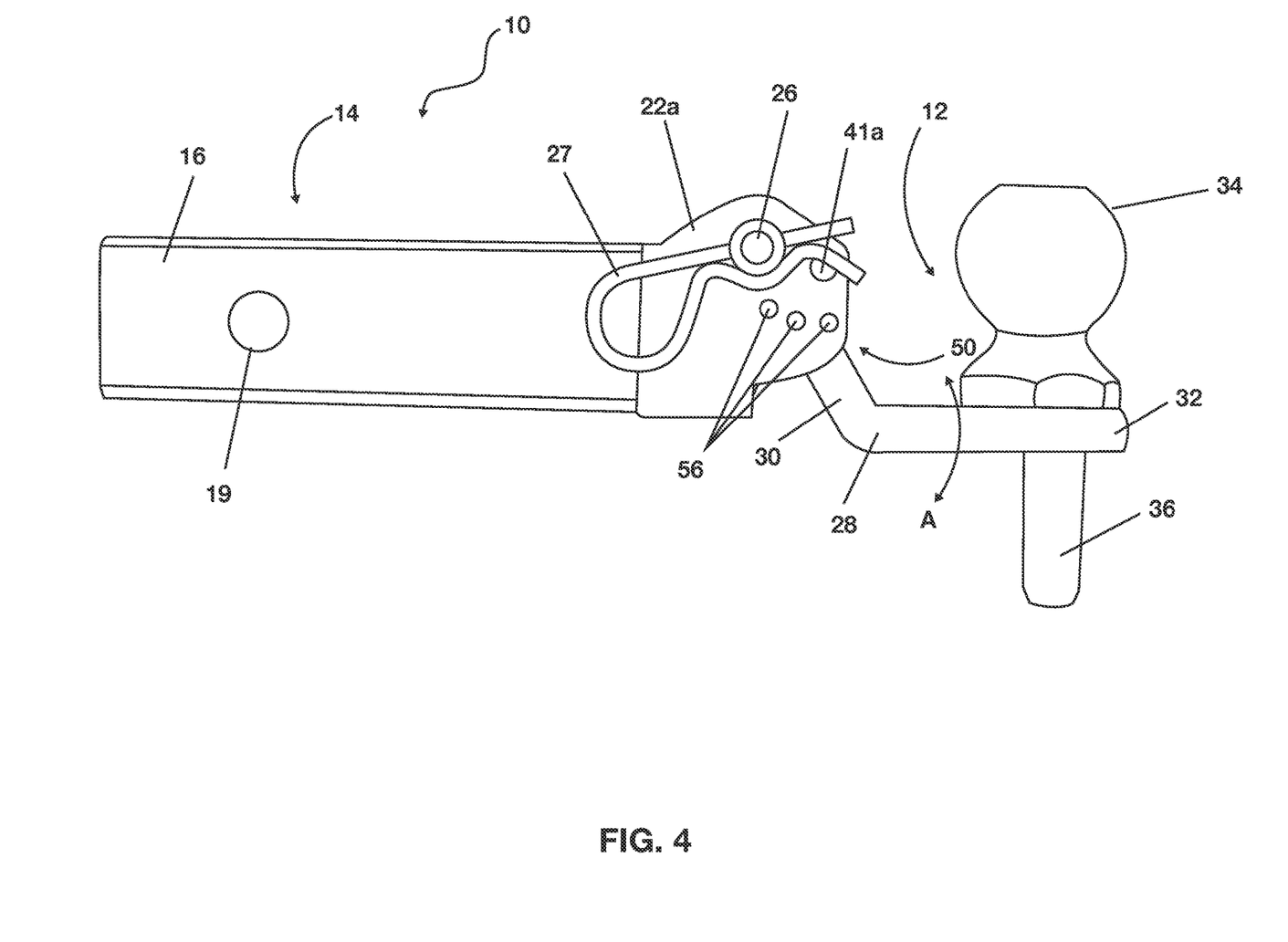
FIG. 4 is side elevation view of the tow hitch assembly of FIG. 1 showing the assembly without weight, such as weight from a trailer tongue, being loaded onto the hitch ball.
Figure 5:
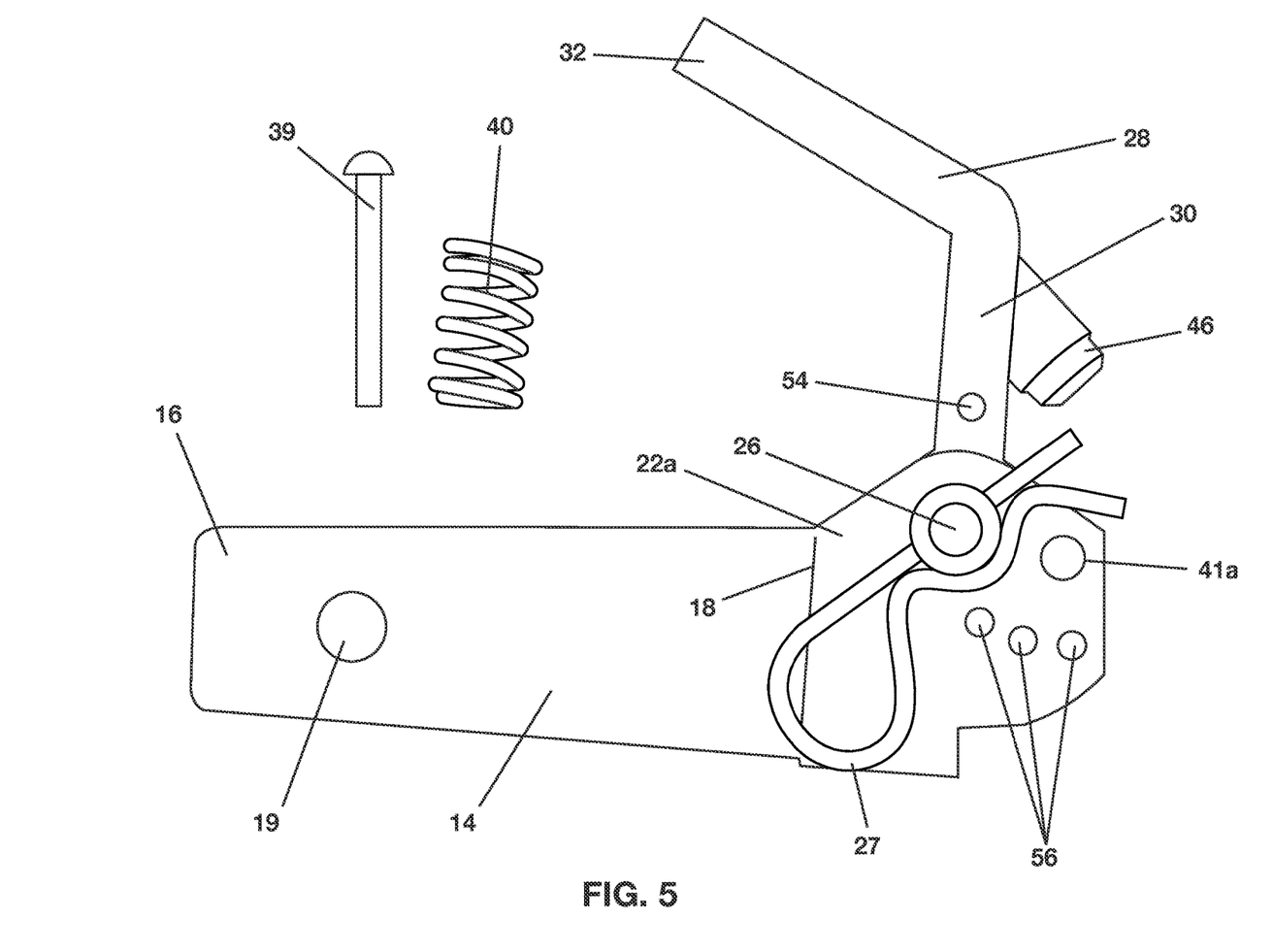
FIG. 5 is a side elevation view of the tow hitch assembly of FIG. 1, showing the removable pin removed from the assembly and the hitch ball mount rotated upward to a position allowing the compression spring to be removed.
Figure 6:
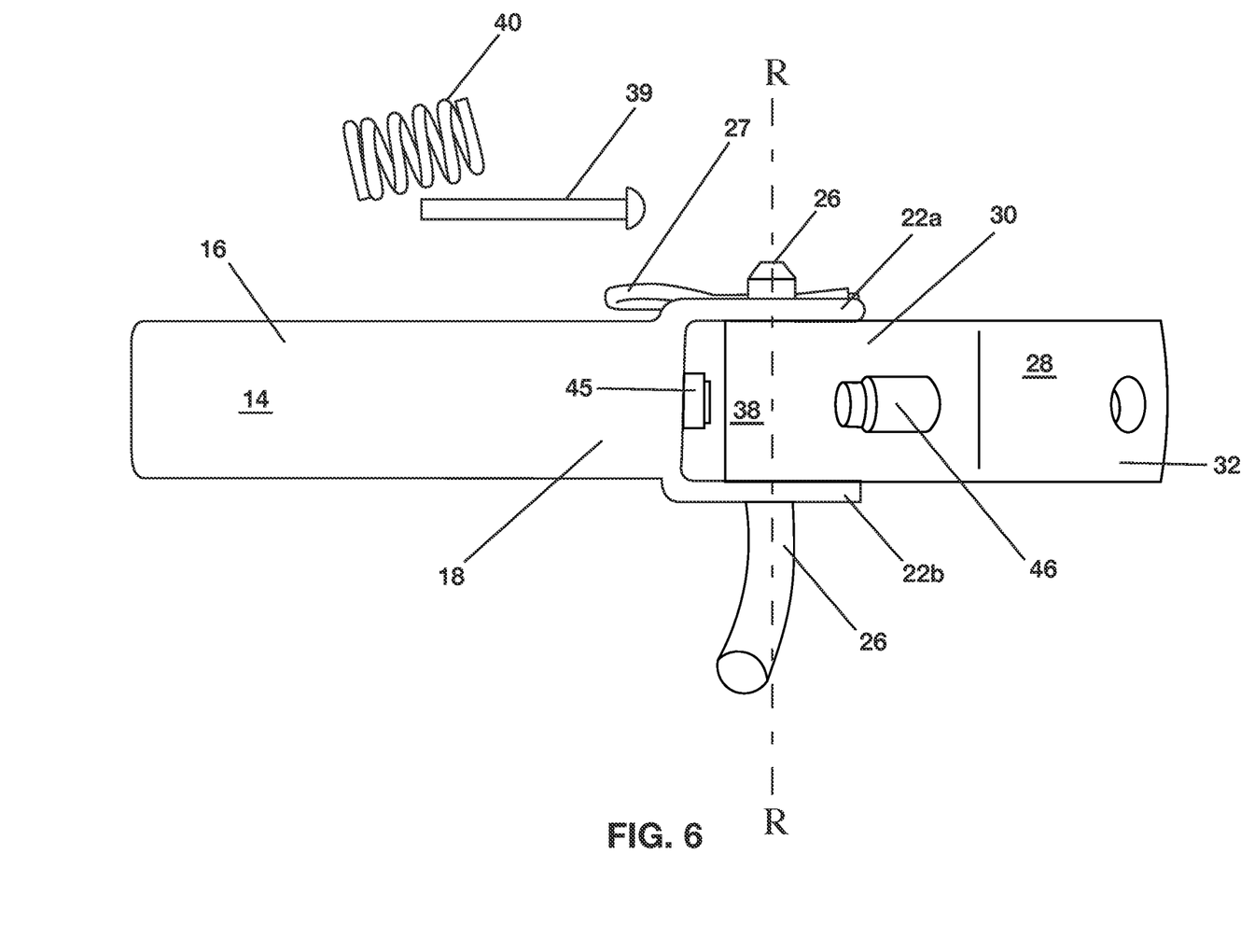
FIG. 6 is bottom plan view of the tow hitch assembly of FIG. 1 showing the removable pin and compression spring removed from the assembly.

Still referring to FIGS. 1-6, the draw bar distal (rearward) portion 18 includes a clevis or yoke 20 having two opposing arms 22a, 22b, each of which has a through-hole 24a, 24b for supporting a clevis pin 26 within the yoke 20 along a transverse rotation axis R, as shown in FIG. 6. The hitch ball mount vertical leg 30 includes a lateral sleeve 38, which receives and is supported by the clevis pin 26 within the yoke 20. The clevis pin 26 is held in place by a clevis pin clip 27. In this configuration, the hitch ball assembly 12 can pivot in an arc A about the clevis pin 26, as shown in FIGS. 2 and 4, such as when weight is placed on the hitch ball 34.

A removable compression spring 40 is disposed longitudinally between the yoke arms 22a, 22b and below the ball mount sleeve 38 such that the compression spring center longitudinal axis S is generally parallel to a longitudinal axis of the draw bar 14 (see FIG. 3). A proximal end 42 of the compression spring 40 is disposed over a first cylindrical protrusion 45, which extends distally from the draw bar distal portion 18. An opposing distal end 44 of the compression spring 40 is disposed over a second cylindrical protrusion 46, which extends forward from the hitch ball mount 28. The compression spring 40 exerts a force that opposes the downward pivoting motion of the hitch ball assembly 12 when weight is placed on the hitch ball 34, such as the weight of a trailer tongue. A removable stop pin 39 is inserted laterally through pin holes 41a, 41b in the yoke side arms 22a, 22b, which are positioned rearward of the clevis pin 26. When inserted, as can be seen in FIG. 3, the removable pin 39 prevents the hitch ball mount 28 from rotating upward to a position where the compression spring 40 would be dislodged from its engagement with the draw bar distal portion 18 and the hitch ball mount 28.

The amount that the hitch ball assembly 12 pivots downward when the trailer is attached depends on the characteristics of the compression spring 40, which can be changed based on the predetermined target trailer tongue weight range. A tongue weight indicator 50 is provided to indicate to a user whether the pre-determined tongue weight has been met when a trailer is attached to the tow vehicle. The indicator 50 can be formed in either of the yoke side arms 22a, 22b. As shown in FIG. 5, in one preferred embodiment, the weight indicator 50 comprises a color marking 54 (e.g., a green marking) on the outer surface of one or both sides of the ball mount vertical leg 30. The color marking 54 works in cooperation with one or more sight window holes 56 formed in the corresponding yoke arm 22a, 22b to indicate when the trailer tongue weight target is within a proper weight range for the tow hitch assembly 10. As shown in FIGS. 1 and 2, when there is no load placed on the hitch ball 34, the color marking 54 is not aligned with any of the sight window holes 56. When a load is placed on the hitch ball 34, as shown in FIG. 4, it causes the hitch ball assembly 12 to rotate in a downward direction along arc A, which causes the color marking 54 to move relative to the sight window holes 56. By selecting a removable compression spring 40 that has the appropriate characteristics, the color marking 54 will appear in a sight window hole 56 (see FIG. 4) when the tongue weight is within a desired range.

A secondary benefit of the tow hitch assembly 10 according to the present invention is that it provides a smoother ride of the tow vehicle/trailer combination. In response to shocks and surges between the trailer tongue and the towing vehicle, the hitch ball assembly 12 will pivot along arc A and the compression spring 40 (or other compressible member as described below) will exert an opposing force. This force will dampen out the vertical loads on the hitch ball 34 and improve the overall "ride" or "feel" of the towing combination by smoothing out the vertical inputs that the trailer imparts on the tow vehicle as the combination travels down the road.

To select a different tongue weight range within which the tongue weight indicator 50 will operate, a user of the tow hitch assembly 10 can simply and conveniently switch out the compression spring 40 for another spring that has different characteristics and that is suitable for operation within the newly selected weight level or range. To do so, the user can remove the removable stop pin 39 and rotate the hitch ball mount 28 upward to a position where the compression spring 40 can be removed from its engagement with the draw bar distal portion 18 and the hitch ball mount 28 (see FIG. 5). A different compression spring can then be selected and inserted in place between the draw bar distal portion 18 and the hitch ball mount 28 as the hitch ball mount 28 is rotated downward into engagement with the compression spring 40. The removable pin 39 can then be reinserted to prevent the compression spring 40 from being inadvertently dislodged.

Figure 7:
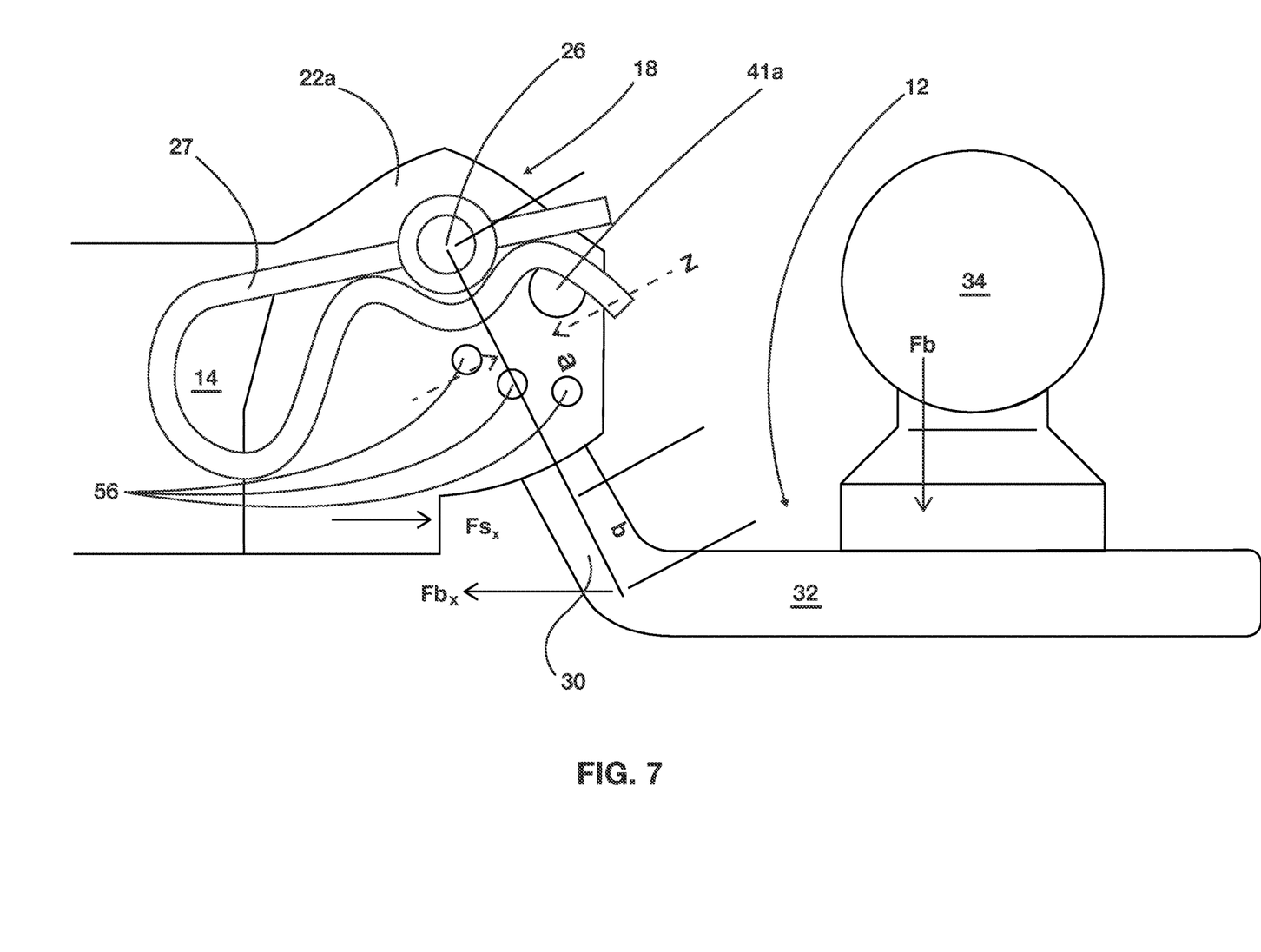
FIG. 7 is a side elevation view of the tow hitch assembly of FIG. 1, which includes information for calculating the spring constant of a compression spring of the tow hitch assembly.

Referring to FIG. 7, selection of a compression spring that corresponds to a given tongue weight range can be determined for the tow hitch embodiment of FIGS. 1-6 by calculating the desired spring constant using the following equations:

$$(Fb_x)(a+b) = (Fs_x)(a), \text{ where}$$

$Fb_x$=Force of the hitch ball in X direction
$Fs_x$=vForce on the spring in X direction
a+b=Length of leg 30 (as shown on FIG. 7)
b=Length from center of clevis pin 26 to axis S of compression spring 40.
Therefore, the force exerted on the spring is:

$$Fs_x = \frac{(Fbx)(a+b)}{a}$$

Hooke's law for a spring is:

$F_s = kx$, where $F_s$ = spring force
k = spring constant (~lb/in)
x = spring compression
z = distance the pivot must travel to show the color marking in the sight window Therefore, to choose the spring, the spring constant is calculated as follows:

$$(z)(k) = \frac{(Fbx)(a+b)}{a}$$

Or $$k = \frac{(Fbx)(a+b)}{a} / Z$$

So the spring constant, k, (i.e., spring selection) is proportional to the force on the hitch ball if the other design parameters are held constant.

Having read this disclosure, those having skill in the art will understand that in place of a compression spring, another type of compressible spring (such as a torsion spring) or a compressible member made of rubber or another elastic deformable material could be used to resist the downward pivoting motion of the hitch ball mount when weight is placed on the hitch ball mount. For example, a compressible member in the form of a rubber cylinder can have a spring constant and could be used instead of a coil spring.

Also having read this disclosure, it will be understood by those having skill in the art that the tow hitch assembly of the present invention enjoys a number of advantages over the prior art. For example, it provides an indicator that is easy to read and clearly indicates to a user whether the trailer tongue weight meets a predetermined level or range. The tow hitch assembly can be easily modified for use with trailers that have different target weight ranges by simply replacing the compression spring with a different compression spring that has a different spring constant. In addition, the compression spring dampens shocks and surges between the trailer tongue and the towing vehicle and thereby provides a smoother ride of the towing combination.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. A tow hitch assembly comprising:
a draw bar configured to be mounted to a towing vehicle;
a hitch ball mount pivotally supported by the draw bar and configured to support a hitch ball; and
a compression spring disposed between the draw bar and the hitch ball mount, wherein the compression spring has a spring constant and exerts a force that opposes a downward pivoting motion of the hitch ball mount when a weight is placed on the hitch ball mount;
wherein the compression spring cooperates with a weight indicator configured to indicate to a user whether the weight placed on the hitch ball mount is within a predetermined weight range;
wherein the compression spring is removable and replaceable with a second compression spring having a different spring constant;
wherein the second compression spring cooperates with the weight indicator to indicate to a user whether the weight placed on the hitch ball mount is within a second predetermined weight range; and
wherein the weight indicator comprises a marking on the hitch ball mount and wherein the marking appears through a sight window hole in the draw bar when the weight placed on the hitch ball mount is within a predetermined weight range.

2. The tow hitch assembly of claim 1, wherein the draw bar includes a yoke configured to support a clevis pin and wherein the hitch ball mount is rotationally coupled to the clevis pin.

3. The tow hitch assembly of claim 2, further comprising a removable stop pin having a portion disposed within the yoke rearward of the clevis pin so as to prevent the hitch ball mount from rotating upward to a position where the compression spring would be displaced from between the draw bar distal portion and the hitch ball mount.

4. The tow hitch assembly of claim 1, wherein a portion of the compression spring is disposed over a protrusion extending rearward from the draw bar.

5. The tow hitch assembly of claim 1, wherein a portion of the compression spring is disposed over a protrusion extending forward from the hitch ball mount.

6. A tow hitch assembly comprising
a draw bar configured to be mounted to a towing vehicle;
a hitch ball mount configured to be pivotally coupled to the draw bar and to support a hitch ball; and
a compression spring configured to be longitudinally disposed generally parallel to a longitudinal axis of the draw bar when the hitch ball mount is pivotally coupled to the draw bar, wherein the compression spring has a spring constant and exerts a force that opposes a downward pivoting motion of the hitch ball mount when weight is placed on the hitch ball mount; and
wherein the compression spring cooperates with a weight indicator configured to indicate to a user whether the weight placed on the hitch ball mount is within a predetermined weight range.

7. The tow hitch assembly of claim 6, wherein the draw bar includes a yoke configured to support a clevis pin and wherein the hitch ball mount is rotationally coupled to the clevis pin.

8. The tow hitch assembly of claim 7, further comprising a removable stop pin having a portion disposed within the yoke rearward of the clevis pin so as to prevent the hitch ball mount from rotating upward to a position where the compression spring would be displaced from between the draw bar distal portion and the hitch ball mount.

9. The tow hitch assembly of claim 6, wherein the compression spring is disposed between the draw bar and hitch ball mount and along an axis generally parallel to a longitudinal axis of the draw bar and wherein a portion of the compression spring is disposed over a protrusion extending rearward from the draw bar.

10. The tow hitch assembly of claim 6, wherein the compression spring is disposed between the draw bar and the hitch ball mount and along an axis generally parallel to a longitudinal axis of the draw bar and wherein a portion of the compression spring is disposed over a protrusion extending forward from the hitch ball mount.

11. The tow hitch assembly of claim 6, wherein the weight indicator comprises a marking on the hitch ball mount and wherein the marking appears through a sight window hole disposed in the draw bar when the weight placed on the hitch ball mount is within a predetermined weight range.

12. A tow hitch assembly comprising
a draw bar configured to be mounted to a towing vehicle;
a hitch ball mount configured to be pivotally coupled to the draw bar and to support a hitch ball; and
a compressible member configured to be disposed between and the draw bar and the hitch ball mount when the hitch ball mount pivotally coupled to the draw bar, wherein the compressible member exerts a force that opposes a downward pivoting motion of the hitch ball mount when weight is placed on the hitch ball mount;
wherein the compressible member cooperates with a weight indicator configured to indicate to a user whether the weight placed on the hitch ball mount is within a predetermined weight range;
wherein the draw bar includes a yoke configured to support a clevis pin and the hitch ball mount is rotationally coupled to the clevis pin;
wherein a removable stop pin is disposed within the yoke rearward of the clevis pin so as to prevent the hitch ball mount from rotating upward to a position where the compressible member would be displaced from between the draw bar distal portion and the hitch ball mount; and
wherein when the stop pin is removed from the yoke, the hitch ball mount can be rotated upward to a position where the compressible member can be removed from between the draw bar and the hitch ball mount.

13. The tow hitch assembly of claim 12, wherein the compressible member is configured to be disposed between the draw bar and the hitch ball mount and along an axis generally parallel to a longitudinal axis of the draw bar.

14. The tow hitch assembly of claim 12, wherein the weight indicator comprises a marking disposed on the hitch ball mount and wherein the marking appears through a sight window hole disposed in the draw bar when the weight placed on the hitch ball mount is within a predetermined weight range.

* * * * *